US006659478B2

(12) United States Patent
Hallgrimsson et al.

(10) Patent No.: US 6,659,478 B2
(45) Date of Patent: Dec. 9, 2003

(54) COMBINATION WALKER AND TRANSPORT CHAIR

(75) Inventors: Bjarki Hallgrimsson, Ottawa (CA); Sarah Dobbin, Ottawa (CA); Douglas D. Macmillan, Ottawa (CA)

(73) Assignee: Random Products Trust (BB)

( * ) Notice: Subject to any disclaimer, the term of this patent is extended or adjusted under 35 U.S.C. 154(b) by 0 days.

(21) Appl. No.: 09/908,102

(22) Filed: Jul. 18, 2001

(65) Prior Publication Data

US 2002/0050697 A1 May 2, 2002

(30) Foreign Application Priority Data

Sep. 12, 2000 (CA) .............................. 2318028

(51) Int. Cl.$^7$ ................................ B62B 11/00
(52) U.S. Cl. ................. 280/47.36; 280/643; 297/283.3; 297/353; 135/74
(58) Field of Search .......................... 280/47.36, 47.39, 280/643, 648, 650, 220, 250.1, 287, 290, 304.1; 135/66, 67, 74; 297/94, 118, 283.3, 353, DIG. 4

(56) References Cited

U.S. PATENT DOCUMENTS

| 4,759,562 | A | 7/1988 | Vinyard et al. | |
|---|---|---|---|---|
| 5,224,731 | A | 7/1993 | Johnson | |
| 5,451,193 | A | 9/1995 | Pickard | |
| 5,558,358 | A | 9/1996 | Johnson | |
| 5,605,345 | A | 2/1997 | Erfurth et al. | |
| 5,772,234 | A | 6/1998 | Luo | |
| 6,338,493 | B1 | * 1/2002 | Wohlgemuth et al. | ...... 280/648 |
| 6,378,883 | B1 | * 4/2002 | Epstein | ...... 280/650 |

FOREIGN PATENT DOCUMENTS

JP 10 277110 A 1/1999

OTHER PUBLICATIONS

Samhall (2 Page Brochure).
Samhall Plus (6 Page Brochure).
Dolomite (4 Page Brochure).
Rajowalt—A Graham–Field Company (4 Page Brochure).
Topro Hilfsmittel (6 Page Brochure).
Evolution Walkers—Evalution Medical Products (4 Page Brochure).

(List continued on next page.)

Primary Examiner—Lesley D. Morris
Assistant Examiner—Matthew Luby
(74) Attorney, Agent, or Firm—Jon Carl Gealow

(57) ABSTRACT

A wheeled walker convertible to a transport chair. The walker has a strap-type backrest that is pivotally attached to the upper end of the handlebars. The backrest can be placed in a forward position when the apparatus is used as a walker and the user wishes to rest in a rearward facing sitting position and in a rearward position when the apparatus is used as a transport chair and the user sits in a forward facing position and is propelled by a care-giver. A novel braking system locates the brake actuating linkage inside the leg and handlebar members and provides accommodates extension height adjustment of the handlebars. A brake lever system providing a linear pull non-cable brake actuation is also disclosed.

13 Claims, 13 Drawing Sheets

OTHER PUBLICATIONS

The "Kombi 1" Mobile Transfer–Chair—Ahlbergs Mekaniska Verksta (20 Page Brochure).
Wheeled Walkers—Carters an Invacare Company (4 page Brochure).
Winnie Walker Company (4 Page Brochure).
Dana Douglas Medical Inc.(4 Page Brochure).
Dana Douglas Medical Inc. (4 Page Brochure).
Ono—Etac GmbH (2 Page Brochure).
Walkers from Etac—Etac GmbH (12 Page Brochure).
Walkerworks Manufacturing Inc. (4 Page Brochure).
Rollator—Reinhold Knochenmub (1 Page Brochure).
Uniroll (1 Page Brochure).
Mall Mobile—Select Medical Technology, Inc. (1 Page Brochure).
Sunrise Collection—Sopur Sunrise Medical (2 Page Brochure).
Kavelyteline Rolle—Satakunnan Tyke–Tuote Oy (1 page Brochure).
Noblemotion, Inc.—Nextstep Rolling Walker (2 Page Brochure).
Uniscan—Shoppers & Walkers (2 Page Brochure).
The Out–N–About—American Walker Inc. (2 Page Brochure).
Companion Walker—Companion Walker Ltd. (4 Page Brochure).
Hilfsmittel fur Da Gehen (2 Page Brochure).
Oaao Bock (4 Page Brochure).
Tuffcare (4 Page Brochure).
Mobi—EC–Bettensysteme (2 Page Brochure).
Liko—Liko InterCare AB (4 Page Brochure).
Jaeger's Rollator Series—Jaeger Indusrial Industrial Co., Ltd. (4 Page Brochure.
Able Walker (2 page Brochure).
Free Spirit—AMG Medical Inc. (2 Page Brochure).
Nova—Etac AB (4 Page Brochure).
Unicar Rollater Walker–Unicare Medical Products Inc. (2 Page Brochure).
Der Esla Rollator—E.S. Lahtinen Oy (1 Page Brochure).
Invacare—Invacare Corporation (4 Page Brochure).

* cited by examiner

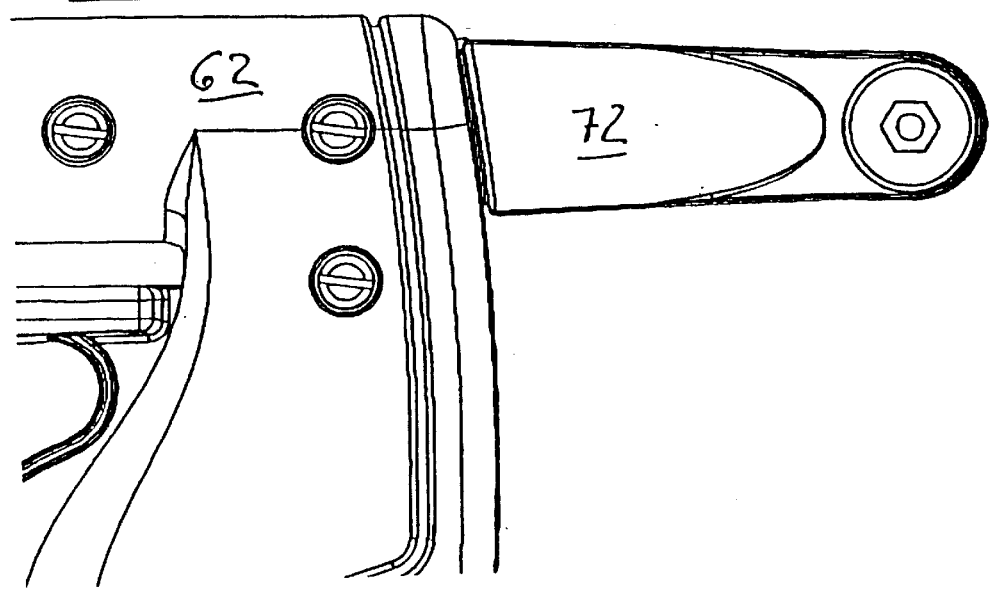
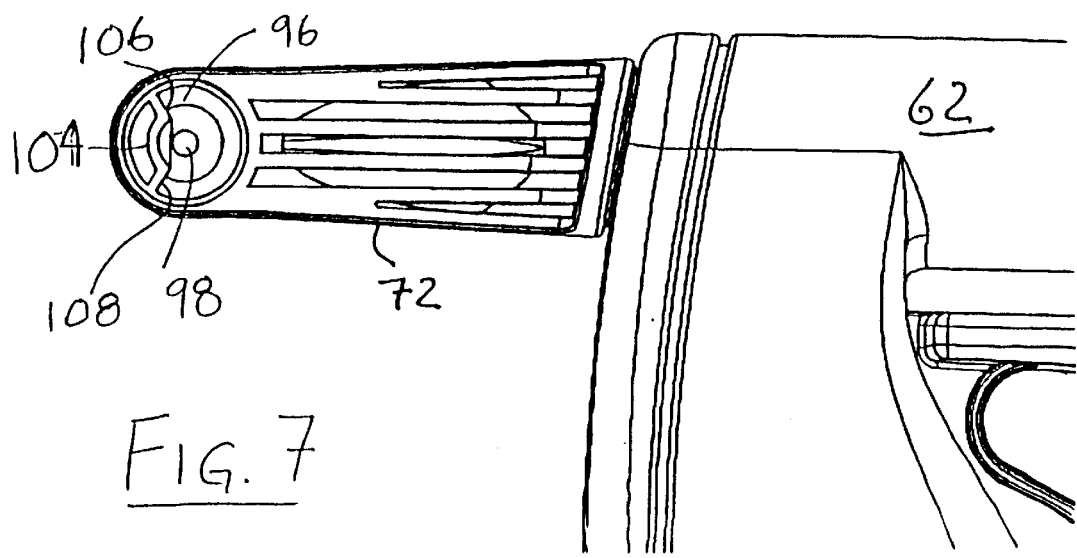

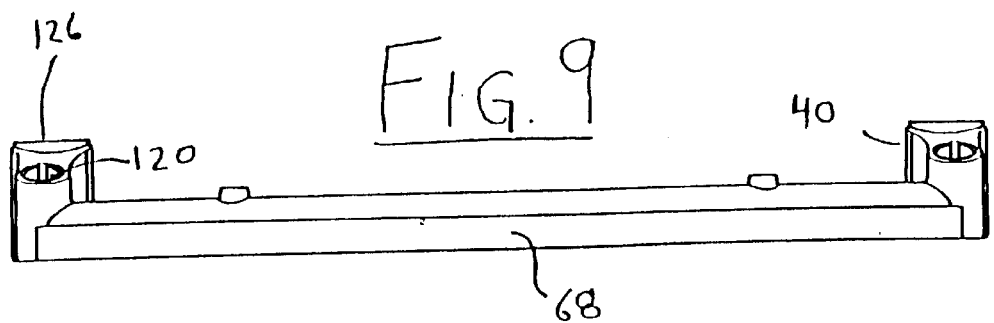
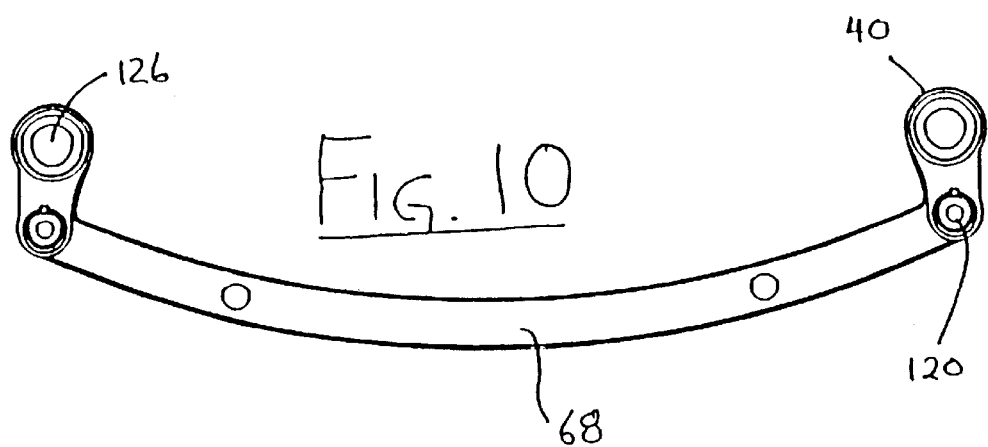
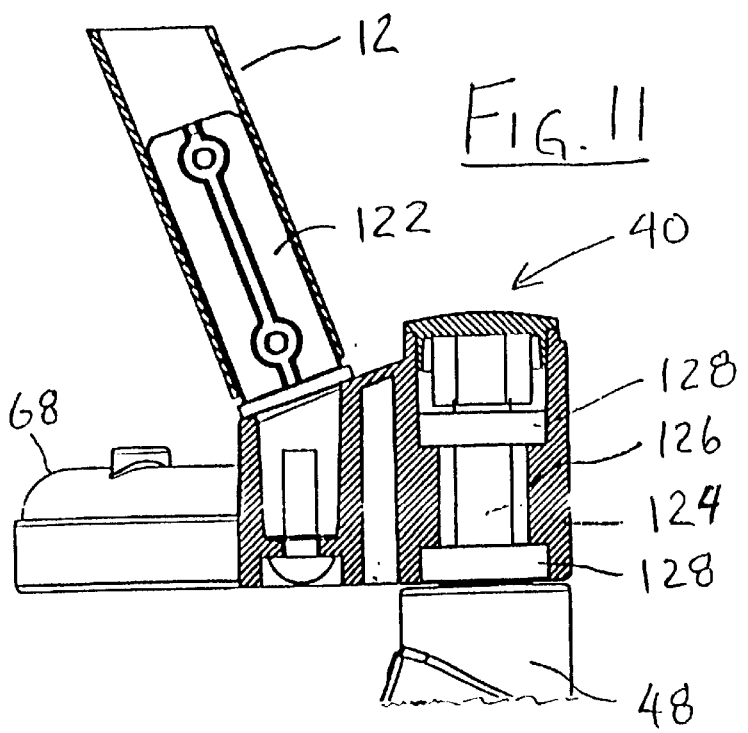

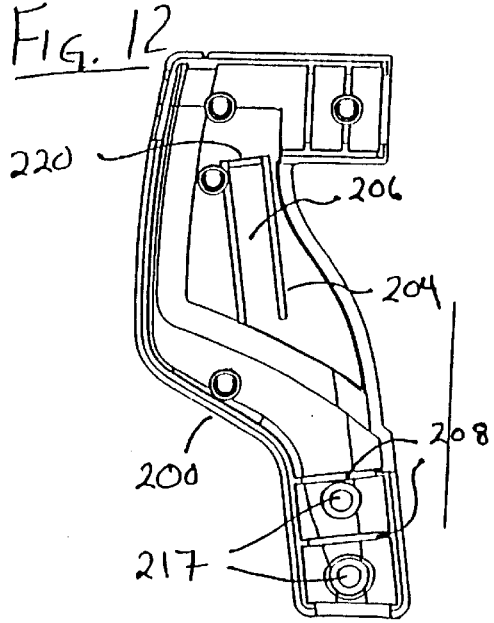
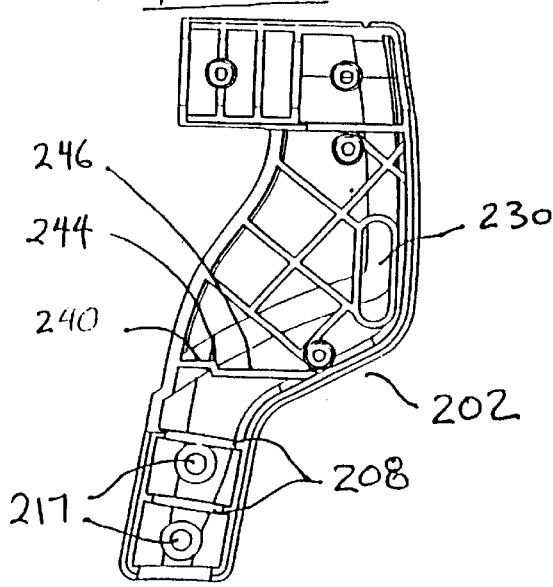
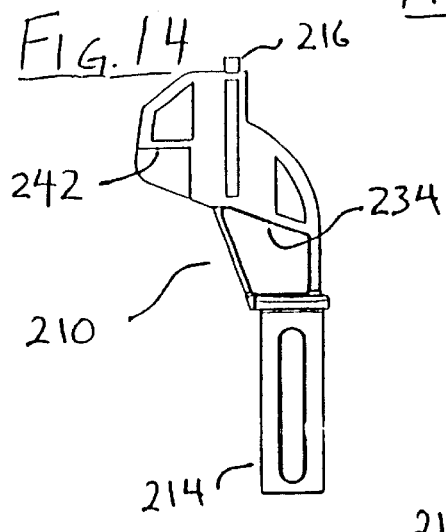
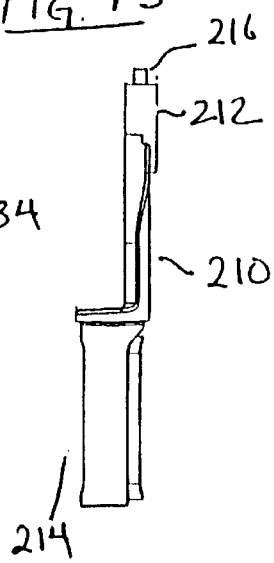
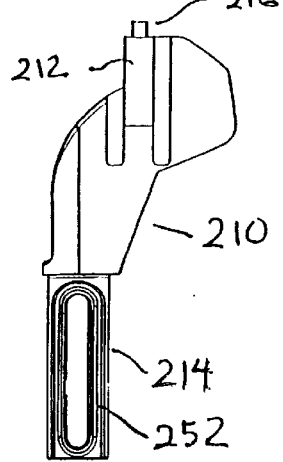

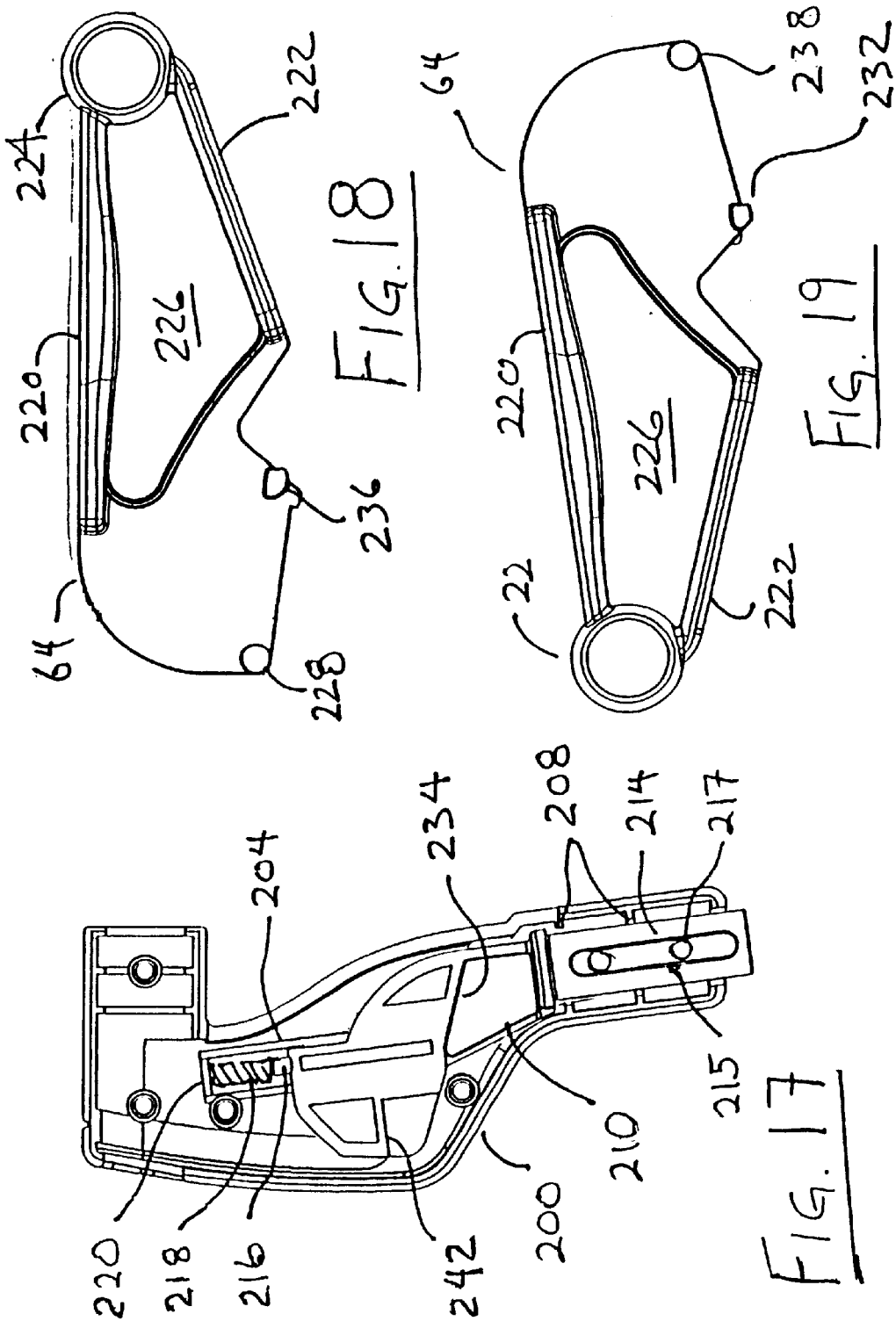

COMBINATION WALKER AND TRANSPORT CHAIR

BACKGROUND OF THE INVENTION

This invention relates to a wheeled walker that can be used as a transport chair for the disabled and to a novel braking system for wheeled apparatus.

Many persons, by reason of age or disability have difficulty in walking without a walking aid. Wheeled walkers are widely used by many such persons to assist in mobility. A wheeled walker typically has a frame mounted on four wheels and a pair of rearwardly extending handle bars which the user can grip for support while walking. The user positions himself between the handle bars behind the walker and pushes the walker forward. The wheels permit the user to roll the walker smoothly over the ground thereby avoiding the laborious action of picking up and moving a non-wheeled walker in step-by-step fashion. The handle bars can be fitted with brake levers that when squeezed by the user, actuate some form of wheel braking mechanism.

Wheeled walkers are routinely equipped with a seating surface that permits the user to rest in the sitting position. The seating surface is usually positioned transversely between the handle bars within the wheel base of the walker to offer a stable platform for sitting. In order to use the seating surface, the user must turn around and sit down in the rearward facing direction, opposite to the normal direction of travel, with his feet resting on the ground. The braking mechanism can be fitted with a locking mechanism to maintain braking engagement with the wheels to prevent the walker from rolling while the user is sitting.

While the provision of a seat to permit the user to rest is a useful feature, it often occurs that the user is too tired to continue walking and requires the assistance of a care-giver continue travel. Conventional wheeled walkers are not adapted to support a seated user and be pushed by a care-giver. In particular, because the user is seated in a rearward facing position between the handlebars, there is very little space between the user and the care-giver, making it difficult for the care-giver to take walking steps without interfering with the feet of the user. Moreover, there is no dedicated means on conventional walkers to support the feet of the user while in the sitting position with the result that the feet are usually dragged across the ground or propped up on a frame member in an unnatural position.

There have been a number of attempts to provide a wheeled apparatus that is useful as a self-propelled walker and also as a care-giver propelled transport chair.

U.S. Pat. No. 5,451,193 discloses a combined wheelchair and walker. In the normal walking position, the seating surface is pivoted up rearwardly toward the seat back to provide space between the handlebars for the user to walk. The user walks in a forward direction pulling the walker behind him. When the user wishes to sit, the seating surface can be flipped down. There is no provision to permit the walker to be pushed by a care-giver. Indeed, the patent discloses that a third party must pull the seated user backwards by pulling on the seat back.

U.S. Pat. No. 5,451,193 discloses a combination wheelchair and walker. While the user or the care-giver can push the apparatus from behind as a conventional walker or transport chair, in order to assume the seated position, the user must walk around to the front of the apparatus, which manoeuvre can be difficult for a physically challenged person.

U.S. Pat. No. 5,605,345 discloses a wheeled apparatus for use both as a walker and a wheelchair. The design has rearward facing handle bars to permit the apparatus to be used as a wheeled walker. The design also has a bi-directional seating arrangement. When the seat is placed in the rearward facing position, it permits the person using the device as a walker to rest in a seated position by turning around and sitting down in the rearward facing direction with his feet resting on the ground. When the seat is placed in the forward facing position, the apparatus can be used as a conventional wheelchair. The wheelchair design is conventional in that it has large rear wheels with hand-rings that permit the wheelchair to be propelled by the occupant or rearward facing handles to permit the wheelchair to be pushed by a care-giver.

While the design disclosed in U.S. Pat. No. 5,605,345 offers significant advantages, it is not well adapted for use as a walker. Because it is based on a conventional wheelchair design, it is heavy and bulky, making it difficult to manoeuvre in confined locations. Furthermore, the bi-directional seating arrangement uses a frame mounted link arrangement which cannot be practicably adapted to a light walker design. Because the seat back is pivoted to the seat base, the vertical rise of the seat back is limited and accordingly offers only lower back support. Furthermore, when positioned in the walker mode, the seat back obscures the user's view of the ground directly in front of the walker.

Conventional walkers have been equipped with handle bar mounted braking system actuators that permit the user to manually apply braking force when walking or to lock the brakes to permit the user to safely assume a seated position. For example, one such system is disclosed in U.S. Pat. No. 5,279,180 and relates to a cable braking system. The actuating mechanism uses a connecting lever to pull the cable when the brake lever is raised to a braking position or depressed to a locked position.

Thus, there remains a need for a walking aid that offers all of the functionality of a conventional wheeled walker and can be readily converted for use as a transport chair.

Cable type braking systems are commonly used on walkers which have height adjustable handle bars. In such a case, the flexible cable accommodates the variable length between the brake handle actuator and the wheel mounted braking element. However, cable type braking mechanisms have a number of deficiencies. In particular, the cables require rather precise and periodic adjustment to maintain effective braking action. Moreover, because the cables are routed from the brake handle actuator to the wheels outside of the frame and require some slack to accommodate height adjustability, the resulting loop or bight in the cable is prone to catching or snagging on other objects, a deficiency which is particularly problematic in the case of a folding style walker that is transported in the trunk of a car.

Thus, there remains a need for a brake actuating system which avoids the problems associated with cable based systems.

SUMMARY OF THE INVENTION

The present invention provides a wheeled walking aid that functions as a conventional walker, but is adapted to also be used as a transport chair. The present invention also provides for a novel braking system in which the brake actuating linkage is internal of structural members, and is length adjustable.

In accordance with the present invention, there is provided a convertible walker/transport chair apparatus, comprising a frame having a longitudinal axis in the forward and rearward directions, a pair of front wheels evenly spaced on either side of said longitudinal axis along a front transverse axis and rotatably mounted at the lower ends of a pair of upwardly extending front leg members, a pair of rear wheels evenly spaced on either side of said longitudinal axis along a rear transverse axis and rotatably mounted at the lower ends of a pair of upwardly extending rear leg members, a horizontal seating surface transversely disposed at the upper ends of said front and rear leg members, a pair of handle bar members slidably received for telescopic movement within the upper ends of said rear leg members and projecting upwardly and rearwardly of said seating surface, a pair of push handle assemblies, each of said assemblies disposed at the upper end of said handle bar member, a backrest connection member projecting forwardly from the upper end of each said handle bar members, a generally arcuate shaped backrest disposed transversely between said backrest connection members, pivotal attachment means disposed substantially in vertical alignment over the longitudinal midpoint of said seating surface for connecting said backrest to said connection members, said pivotal attachment means permitting said backrest to be pivoted between a first position in which said backrest extends in a generally horizontal forward projecting position adapted to support a rearward facing seated user's back when in the walker configuration and a second position in which said backrest extends in a generally horizontal rearward projecting position adapted to support a forward facing seated user's back when in the transport chair configuration, and stop means for selectively retaining said backrest in said first or second position. The backrest connection members are preferably connected to said push handle assemblies and is a strap formed of a flexible plastic material with said attachment means integrally moulded at the ends thereof.

In a preferred embodiment, the walker/transport chair includes a cross-bar member extending transversely between the lower ends of said front leg members, the cross-bar member having a central portion thereof that is disposed substantially in vertical alignment with the front edge of the seating surface. The cross-bar may include integrally moulded end fittings extending forward of the lower end of said forward leg members, and wherein each of said front wheels is rotatably mounted in a caster type fork assembly having a vertically disposed mounting shaft, said mounting shaft being rotatably received in said end fitting.

In a preferred embodiment, the walker/transport chair may include a footrest member mounted for pivotal movement between a stowed position transversely disposed between said front leg members and a deployed position projecting forward of the lower ends of said front leg members for supporting a forward facing seated user's feet when in the transport chair configuration.

In accordance with another aspect of the invention, there is provided an apparatus for actuating a brake of a wheeled vehicle comprising a housing, a brake lever having a forward end retained in said housing and a handle projecting from the rear of said housing, and manually operable between a neutral position, a raised brake actuating position and a depressed brake locking position, said brake lever having a first pivot means and a first abutment surface located near the forward end of said brake lever, and a second pivot means and a second abutment surface located intermediate the forward end and the handle of said brake lever; whereby when said handle is raised from said neutral position to said brake actuating position said brake lever pivots about said first pivot means and said second abutment surface is moved to a raised position and when said handle is depressed from said neutral position to said brake locking position said brake lever pivots about said second pivot means and said first abutment surface is moved to a raised position, a brake actuating slide member retained in said housing having a third abutment surface in opposed relation with said first abutment surface whereby said upward movement thereof moves said slide upward along said axis and having a fourth abutment surface in opposed relation with said second abutment surface whereby said upward movement thereof moves said slide upward along said axis.

BRIEF DESCRIPTION OF THE DRAWINGS

FIG. 6 is a right side view of the back rest extension arm;

FIG. 7 is a left side view the back rest extension arm;

FIG. 9 is a front view of the cross-bar member;

FIG. 10 is a top plan view of the cross-bar member;

FIG. 11 is a right side view in partial section of the cross-bar member connection details;

FIG. 12 is a side view of the inside of the right brake housing half;

FIG. 13 is a side view of the inside of the left brake housing half;

FIG. 14 is a left side view of the brake actuator slide;

FIG. 15 is a rear view of the brake actuator slide;

FIG. 16 is a right side view of the brake actuator slide;

FIG. 17 is a side view of the inside of the right brake housing half showing the position of the brake actuator slide;

FIG. 18 is a left side view of the brake lever;

FIG. 19 is a right side view of the brake lever;

DESCRIPTION OF THE PREFERRED EMBODIMENT

Figure 1:
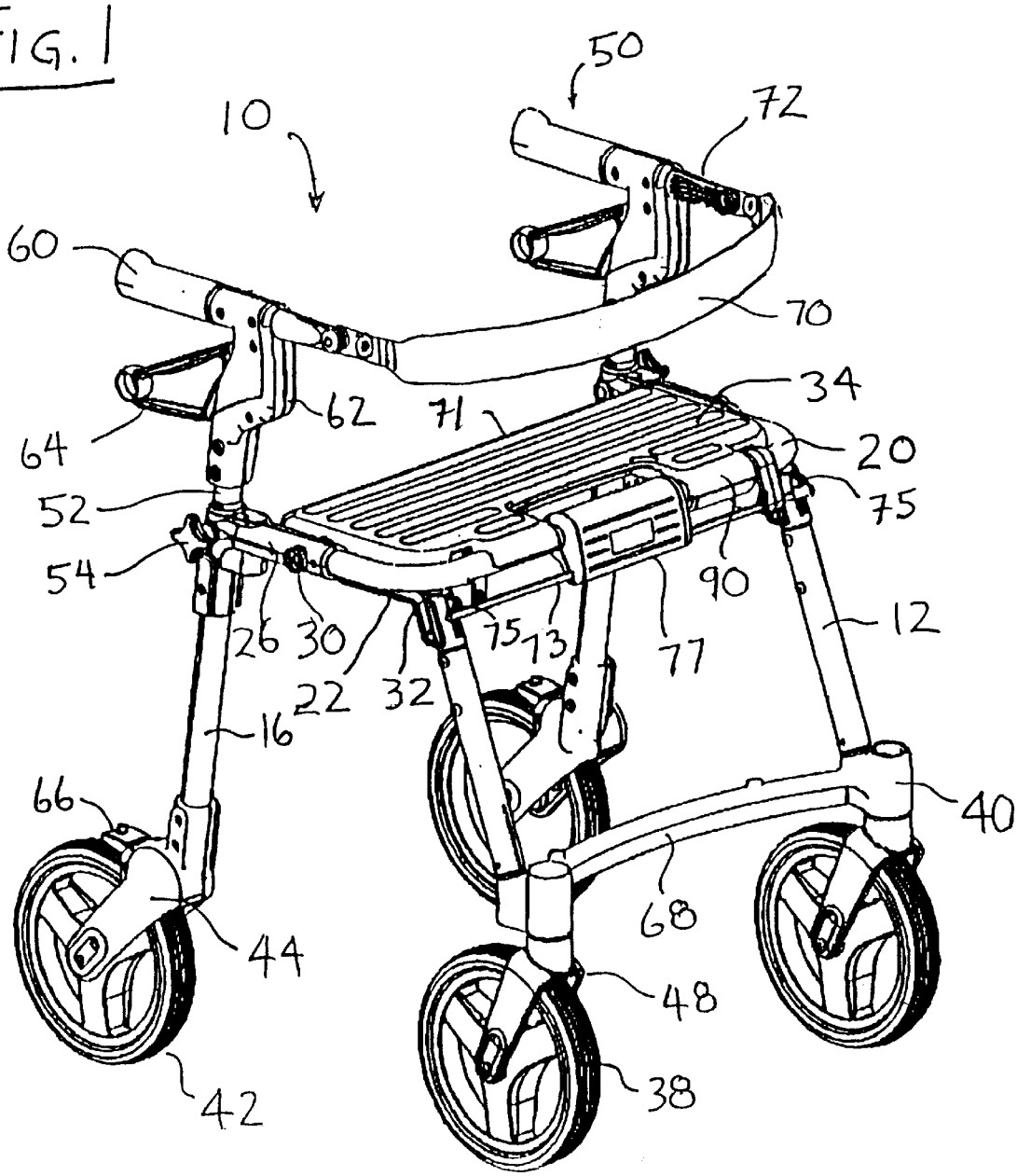
FIG. 1 is a front right perspective view of the walker/transport chair of the present invention with the back rest in the walker position.
Figure 3:
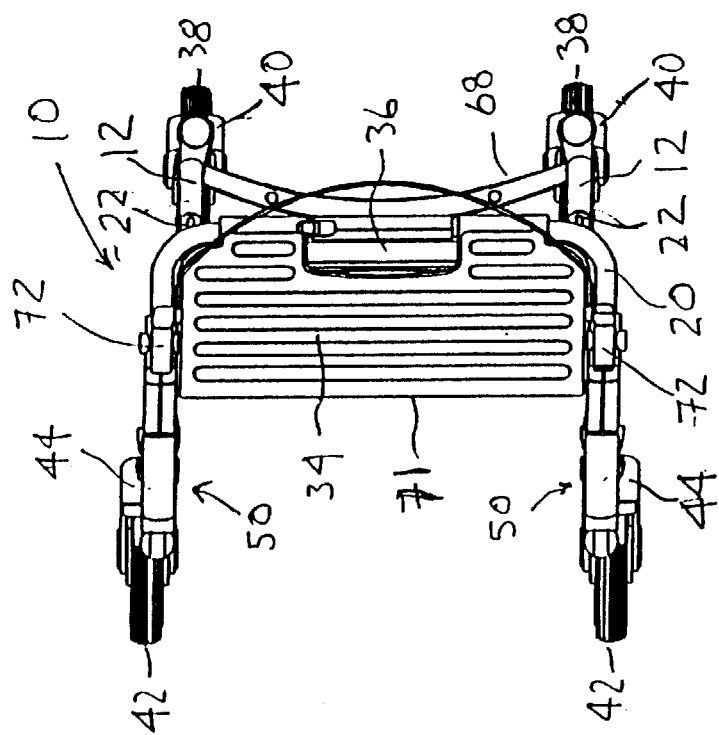
FIG. 3 is a plan view of the walker/transport chair of the present invention with the back rest in the walker position.
Figure 2:
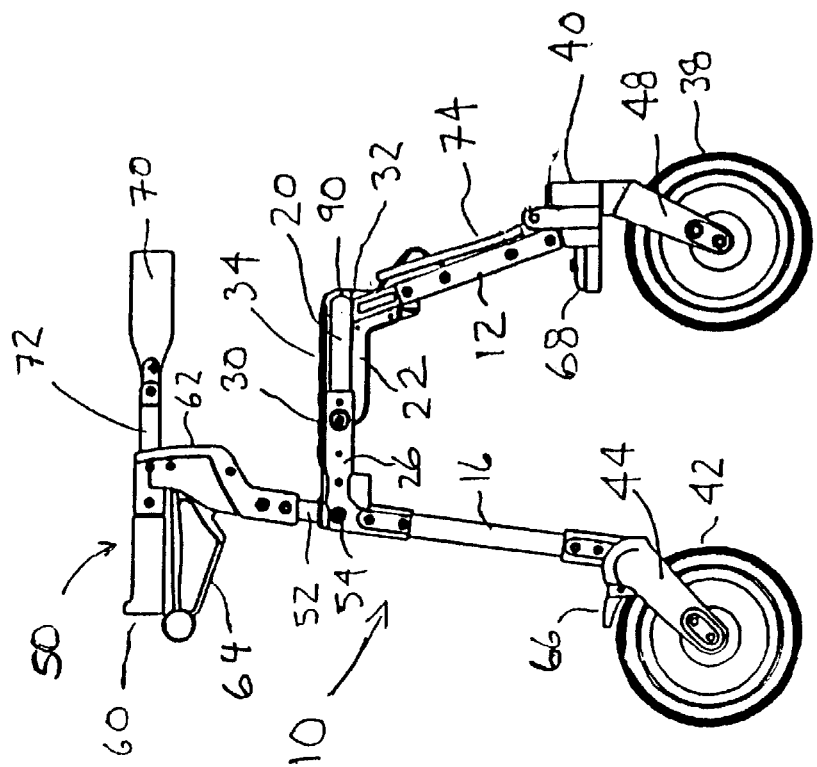
FIG. 2 is a right side view of the walker/transport chair of the present invention with the back rest in the walker position.

Referring to FIGS. 1 to 3, there is shown a perspective view of walker/transport chair 10 in the walker configuration. Walker/transport chair 10 has a pair of forward leg members 12, a pair or rearward leg members 16, and a U-shaped transverse seat support member 20. Front leg members 12 are fixedly secured at their upper ends to front leg brackets 22 and rear leg members 16 are fixedly attached at their upper ends to rear leg brackets 26. Front leg brackets 22 are pivotally attached to rear leg brackets 26 at pivot pins 30. In the open or operative position shown in FIGS. 1 to 3, abutment surfaces 32 at the upper ends of front leg brackets 22 engage the forward lower edge of seat support member 20 when forward leg members 12 are in the open and weight bearing position. Front leg brackets 22 permit the front leg members 12 to be folded toward rear leg members 16 in order to collapse walker/transport chair 10 into a more compact configuration, for example for placement in the trunk of a car.

Walker/transport chair 10 is locked in the open position by means of lock rod 73 which engages projections 75 on front leg brackets 22. Handle 77 is rotatably mounted about transverse seat support member 20 for moving lock rod 73 out of engagement with projections 75. Handle opening 36 is provided in seating surface 34 to provide easy access to handle 77.

Seating surface 34 is horizontally supported at its forward edge 90 by transverse seat support member 20 and provides a stable seating platform. Seating surface 34 is pivotally attached to transverse seat support member 20 such that it can be flipped to a vertical position by pulling up on rear edge 71. This position is particularly useful when the user wishes to move as far forward as possible, for example when reaching ahead of the walker/transport chair to remove objects from a cupboard.

Front leg members 12 are stabilized by cross-bar member 68 which extends horizontally between front leg members 12 and is fixedly secured to the bottom ends of front leg members 12 at end fittings 40. Front wheels 38 are mounted on front fork assemblies having a vertical axle shaft carried in a bearing assembly (not shown) in each end fitting 46 for rotation about the vertical axis to permit front wheels 38 to caster for ease of steering walker/transport chair 10.

Rear wheels 42 are carried at the lower ends of rear leg members 16 on rear fork assemblies 44. Rear fork assemblies 44 are fixedly connected to the lower ends of rear leg members 16.

Push handle assemblies 50 are fixedly attached to the upper ends of telescopic tubes 52 which are slidably received in rear leg members 16. The height of push handle assemblies 50 can be adjusted by extending or retracting telescopic tubes 52 in rear leg members 16. Telescopic tubes 52 have a series of through holes at uniform spacings along their length through which thumb screws 54 can be selectively inserted to fix push handle assemblies 50 at the desired height.

Push handle assemblies 50 comprise handgrips 60, handle housings 62 and brake levers 64. Brake levers 64 are operatively connected to brake shoes 66 by length adjustable rod assemblies housed within telescopic tubes 52 and rear leg members 16. Movement of brake levers 64 will cause brake shoes 66 to move into braking engagement with the tread of rear wheels 42 thereby arresting rolling motion.

When walker/transport chair 10 is in the walker configuration as shown in FIGS. 1 to 3, the user positions himself behind walker/transport chair 10, and between push handle assemblies 50 facing the forward direction. In order to function as an effective walker, it is desirable that the geometry of the walker be such that the user can position himself far enough forward that his centre of gravity is vertically aligned over handgrips 60. This will permit the user to support a substantial portion of his weight on handgrips 60 when desirable to reduce the weight on the feet. In order to ensure stability of the walker when a substantial vertical load is placed on handgrips 60, the handgrips must be positioned forward of the point of ground contact of rear wheels 42. Moreover, in order to facilitate walking, there must be sufficient room in front of the user to permit him to extend his feet forward in a natural walking gait without interfering with the walker structure, and in particular with the seating surface. Accordingly, the position of seating surface 34 is biased to the front of walker/transport chair 10 such that its rear edge 71 is forward of handgrips 60. In addition, seating surface 34 can be flipped to a vertical position about transverse seat support member 20 as described above. This will provide the user with additional space to move forward between push handle assemblies 50 if desired.

When the user wishes to rest, he simply turns around between push handle assemblies 50, using handgrips 60 for support if required, and sits down on seating surface 34, with his feet on the ground. Backrest 70 is provided to support the user's back while seated on walker/transport chair 10. Backrest 70 is attached to extension arms 72 which are fixed at their rearward ends to push handle assemblies 50.

Figure 8:
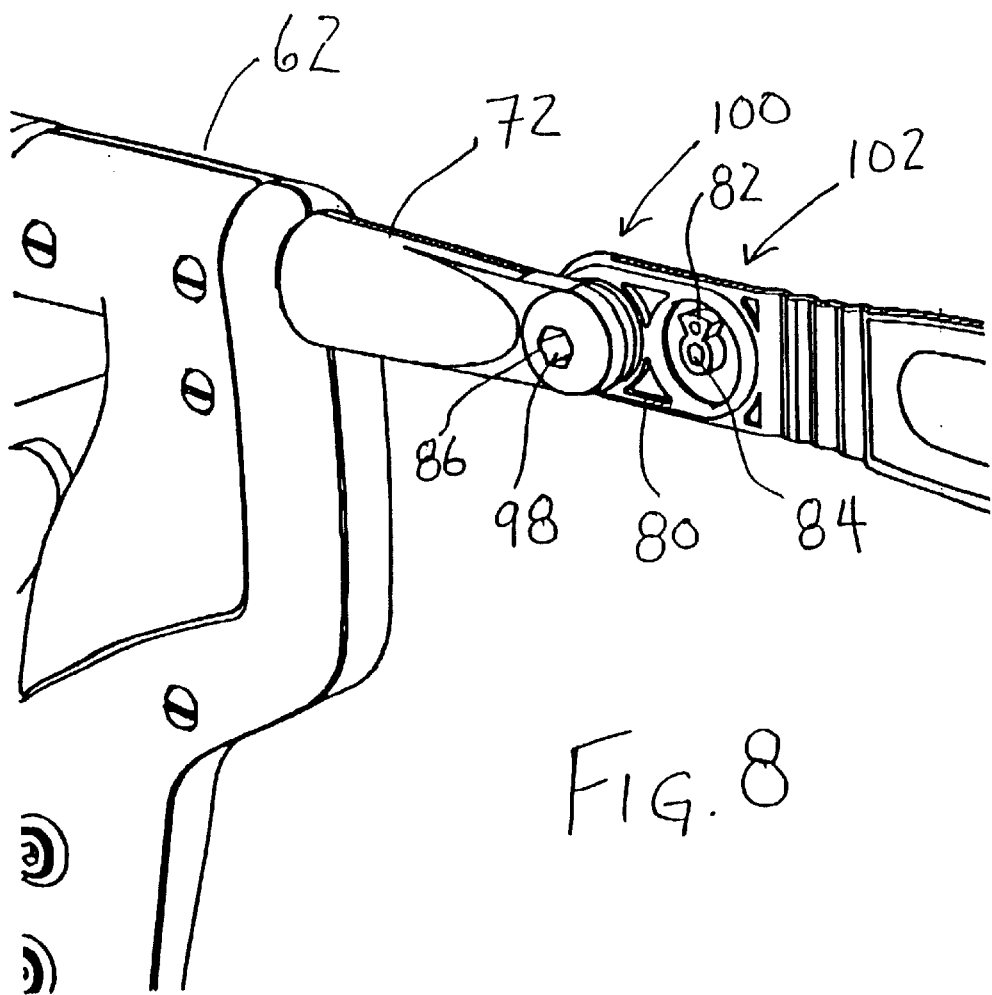
FIG. 8 is a perspective view showing the manner in which the backrest is connected to the extension arms.

FIGS. 6, 7 and 8 show the details of extension arms 72 and the manner in which backrest 70 is attached to extension arms 72. Extension arms 72 each have an inward facing part-annular recess 96 with a central cylindrical bore 98 formed therethrough. Backrest 70 has formed therein two mounting points 100 and 102 for attachment to extension arm 72. Mounting point 100 can be used as the point of attachment for a larger user whereas mounting point 102 effectively shortens the length of backrest 72 for a smaller user. The configuration of mounting points 100 and 102 is identical and will be described with reference to point 102 which is visible in FIG. 8.

Backrest 70 is formed of a flexible plastic material and at each end has a connection piece 80. Backrest 70 and connection piece 80 can be unitarily moulded of a suitable plastic material that has sufficient flexibility in the central back-supporting area to conform to and support a user's back and sufficient mechanical strength to function as a connection piece. In the alternative, backrest 70 and connection piece 80 can be separate components joined together. Moreover, backrest 70 can be formed of a rigid material such as aluminum if a non-flexible backstrap type backrest is desired. Connection piece 80 has an outwardly projecting key type lug 82 and a central bore 84 formed therethrough. Part-annular recess 96 in extension arm 72 is sized to fit over and closely receive key type lug 82 on backrest 70 with the cylindrical bores 84 and 98 axially aligned. A suitable bolt (not shown) with a smooth shank passes through cylindrical bores 84 and 98 and is fastened with a captive nut (not shown) located in hex-head recess 86 in connection piece 80. In this manner, backrest 70 is pivotally connected to extension arms 72.

Stop lug 104 projects inwardly of recess 96 in extension arm 72. Abutment surface 106 on stop lug 104 limits forward rotation of backrest 70 by contacting key type lug 82 in connection piece 80 and maintains backrest 70 in the forward facing horizontal position. Similarly, abutment surface 108 limits rotation of backrest 70 by contacting key type lug 82 in connection piece 80 and maintains backrest 70 in the rearward facing horizontal position. This arrangement permits backrest 70 to be manually flipped from the forwardly extending position shown in FIGS. 1 to 3 for use in the walker mode, to the rearwardly facing position, shown in FIGS. 4 and 5 for use in the transport chair mode.

Figure 5:
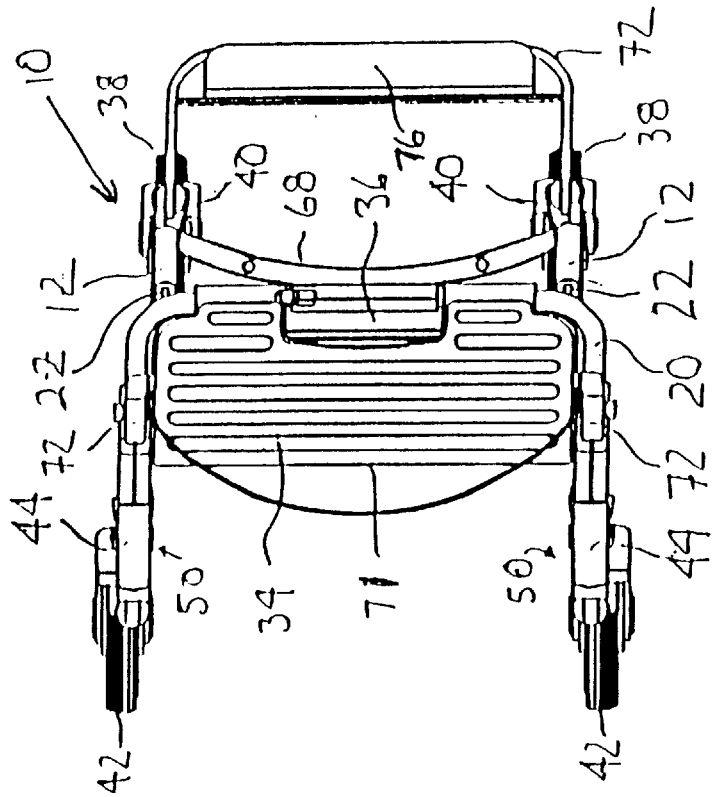
FIG. 5 is a plan view of the walker/transport chair of the present invention with the back rest in the transport chair position.
Figure 4:
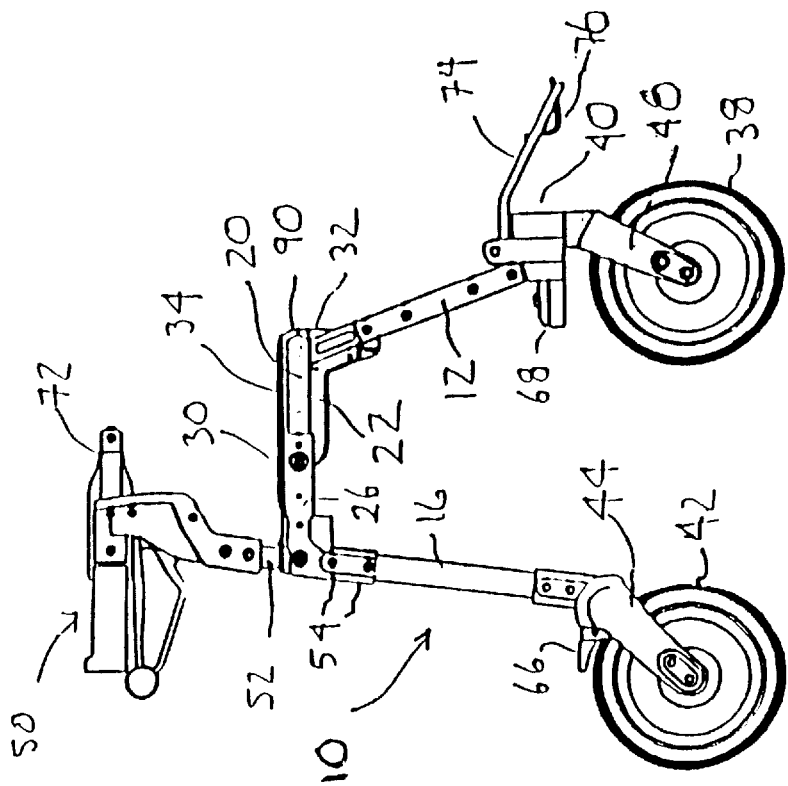
FIG. 4 is a right side view of the walker/transport chair of the present invention with the back rest in the transport chair position.

When walker/transport chair 10 is in the transport chair configuration, the user or a care-giver flips backrest 70 to the rearward extending position as shown in FIGS. 4 and 5. The user positions himself in front of and facing away from walker/transport chair 10 and sits down on seating surface 34 with his back against backrest 70. Footrest 72 is then folded from the stowed position shown in FIGS. 2 and 3 to the deployed position shown in FIGS. 4 and 5. The user rests his heels on footrest tray 76 and in that position can be comfortably propelled by the care-giver in the transport chair mode. (Footrest 72 has been omitted from FIG. 1 to show greater detail of cross-bar 68). The forward facing seated position is not only useful when the apparatus is being propelled by a care-giver in the transport chair mode, but also permits the apparatus to be positioned close to a table, for example when eating a meal. Conventional walkers in which the user is seated in the rearward facing position are not well suited to this application because the rearward projecting handgrips and the rear wheels limit how close the walker can be placed, while the seating surface is typically positioned far forward of the hangrips.

Conventional walkers usually require a cross-bar between the front leg members to strengthen the frame against collapse when the walker is bearing substantial weight, for example, when the user is seated. A front cross-bar is particularly required where the front leg members are pivotally attached to the frame to permit folding, which pivotal attachment provides little resistance to outward splaying of the legs under load.

For conventional walkers, the presence of a cross-bar between the front legs of the walker typically does not interfere with the user's movements, as the user is positioned behind the walker in both the walking and sitting positions. However, the front cross-bar on a conventional walker interferes with its use as a transport chair. In particular, in order to assume the forward facing sitting position in the transport chair mode, a user must be able to position his heels very close to a point on the ground directly under the front edge of the seating surface. If the user is positioned too far forwards, he tends to lose balance when attempting to assume the seated position, falling backward in an uncontrolled manner onto the seating surface. This can cause the walker to upset resulting in serious injury to the user. Conventional cross-bars are usually positioned well forward of the front edge of the seating surface and accordingly tend to prevent a user from positioning his heels close to a point on the ground directly under the front edge of seating surface.

The walker/transport chair design of the present invention is configured to overcome the limitations of conventional walker frame design. First, as seen in FIG. 1 front leg members 12 are positioned at an angle closer to vertical than are most conventional walkers. This minimizes the extent to which the lower ends of front leg members 12, and consequently cross-bar 72, project forward of the forward edge 90 of seating surface 34. However, this has the undesirable effect of shortening the wheelbase and lessening stability. In order to provide for a lengthened wheelbase, the front fork assemblies 48 are not secured axially inside the lower end of front legs 12 as is conventional practice in walker design. Instead, front fork assemblies 48 are secured in end fittings 40 which project forwardly from the lower end of leg members 12, effectively lengthening the wheelbase.

Another feature of the present invention that enhances its use as a transport chair is the design of cross-bar 68. As best shown in FIGS. 4 and 5, cross-bar 68 attaches to front leg members 12 at their lower ends, which point is forward of the forward edge 90 of seating surface 34. In order to permit the user to more safely assume the forward-facing seated transport chair position, cross-bar 68 is rearwardly curved such that its central portion is located substantially under the forward edge 90 of seating surface 34. This curved cross-bar arrangement permits the user to place his heels close to a point on the ground directly under the front edge of seating surface, and thereby. While a curved geometry is shown in the drawings, other configurations could be used so long as the cross-bar is configured such that its central portion is located substantially under or behind the forward edge 90 of seating surface 34.

Construction details of cross-bar 68 and end fittings 40 can be seen in FIGS. 9 to 11. Cross-bar 68 and end fittings 40 are unitarily moulded or cast from a material of suitable strength. For example cross-bar 68 can advantageously be formed of cast aluminum. Cylindrical bores 120 are provided in cross-bar 68 to receive connector piece 122 which is bolted into the lower ends of forward leg member 12. Front fork shaft 124 is vertically received in bore 126 and is rotatable retained by upper and lower bearings 128 fitted in bore 126.

As noted above, the front fork assemblies of conventional walkers are typically inserted directly into the hollow ends of the leg members. The fork mounting shaft is usually carried in a single bearing which is press-fitted into the bottom end of the leg member. This arrangement is prone to failure. In particular, repetitive striking of the wheels into curbs and other obstacles and impact over rough road surfaces has a tendency to deform and widen the lower end of the leg members into which the bearing is pressed. This can cause the bearing, and the entire fork/wheel assembly to fall out of the bottom of the leg member. By mounting the front fork assemblies 48 to end fittings 40 fitted with two bearings, rather than directly into a single bearing in the bottom end of the leg, the ability of the fork assemblies and the lower leg mounting hardware to absorb shock, without failure is greatly improved.

The design of the walker/transport chair 10 permits the use of a novel and effective braking system. Conventional walkers use Bowden cables which extend from the hand grip mounted brake levers to the braking wheels. Bowden cables are relatively inexpensive and because they are flexible, can be installed with excess length in a free standing loop or bight to accommodate changes in length occasioned by the adjustment of handgrip height. However, the use of a Bowden cable arrangement has a number of disadvantages. The same free standing loop or bight that permits handgrip height adjustability is prone to being caught or hooked on various obstructions, particularly when the walker is loaded into, or unloaded from the trunk of a car. In addition, Bowden cables must be accurately adjusted and even a slight lack of adjustment can cause unsatisfactory braking action.

The design of the present invention permits the use of an internal brake actuating mechanism. Referring to FIGS. 12 and 13, handle housing 62 comprises right side housing shell 200 and left side housing shell 202 which are bolted at their lower ends to telescopic tube 52. Hand grip 60 is bolted between right side housing shell 200 and left side housing shell 202 at their upper ends. Brake lever 64 is retained between right side housing shell 200 and left side housing shell 202 in the manner described below.

Referring to FIG. 12, the inside face of right side housing shell 200 is shown. Raised wall 204 forms an elongated groove 206 on the inside face with a longitudinal axis that is parallel to telescopic tube 52. Semicircular bearing surfaces 208 are formed in the lower portion of the inside face.

Referring to FIGS. 14 to 16, brake actuator 210 has raised tongue portion 212 which is sized to be slidably retained in elongated groove 206 of right side housing shell 200 and cylindrical portion 214 which is sized to be slidably retained in semicircular bearing surfaces 208 of right side housing shell 200.

FIG. 17 shows the position of brake actuator 210 when it is slidably received in right side housing shell 200. Bias spring 218 is carried between retaining lug 216 formed at the upper end of brake actuator 210 and stop wall 220 formed at the upper end of groove 206 and biases brake actuator 210 in the downward direction. Brake actuator 210 has elongated aperture 215 formed through cylindrical portion 214. This elongated aperture 215 permits cylindrical portion 214 to extend down into telescopic tube 52 and allow bolts to pass through bolt holes 217 in right side housing shell 200, telescopic tube 52, elongated aperture 215, telescopic tube 52 and bolt holes 217 in left side housing shell without interfering with the vertical sliding motion of brake actuator 210. Such a through-bolting arrangement greatly improves the mechanical strength of the attachment of push handle assemblies 50 to telescopic tubes 52.

Referring to FIGS. 18 and 19, brake lever 64 comprises upper arm 220 and lower arm 222 joined at their rear extremities by ball shaped gripping projection 224. Brake lever 64 is shaped such that braking action, as more completely described below, can be effected by placing the hands on handle grips 50, inserting fingers through opening 226 and pulling up on upper arm 220 with inward gripping action. Downward pressure on lower arm 222 will move brake lever 64 downward into a locked or "parked" position, also as more completely described below. Ball shaped gripping projection 224 assists in moving brake lever in a downward direction by enabling the user to hook a thumb over the projection to apply downward force. This is particularly useful for a user with strength or mobility limitations in the hands.

Pivot pin 228 projects from the left side of brake lever 64 at its forward end and is sized to be received in slot 230 formed in the inside surface of left side housing shell 202. Brake actuating lug 232 projects from the right side of brake lever 64 and its upper surface engages downward facing abutment surface 234 formed in brake actuator 210. Camming lug 236 projects from the left side of brake lever 64. Brake lock actuating lug 238 projects from the right side of brake lever 64 at its forward end opposite pivot pin 228.

Figure 20:
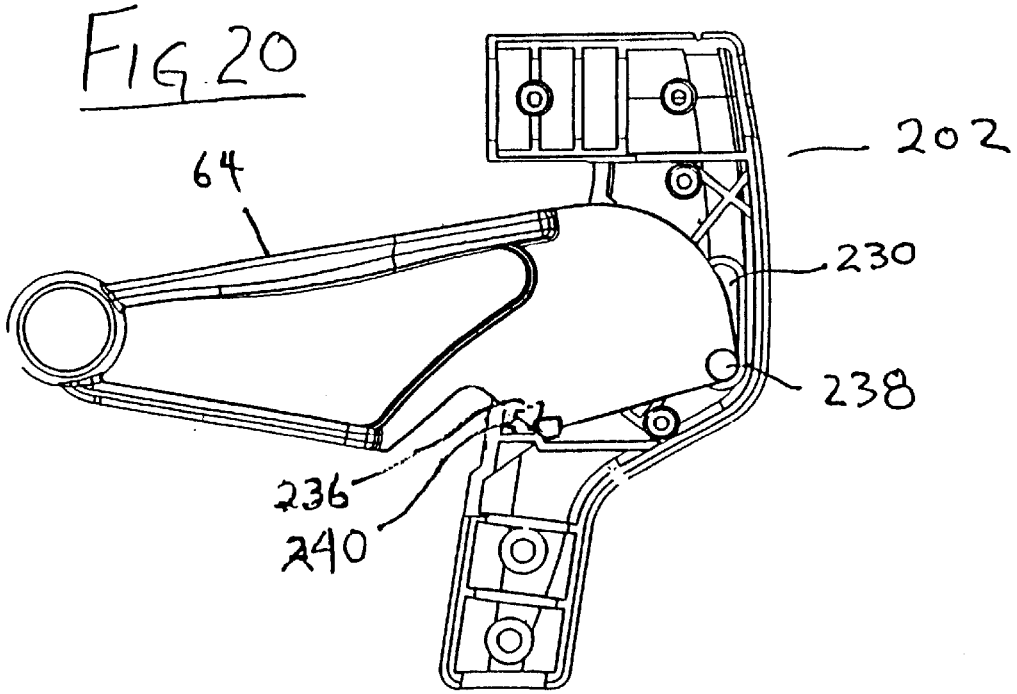
FIG. 20 is a side view of the inside of the left brake housing half showing the brake lever in the neutral position.
Figure 22:
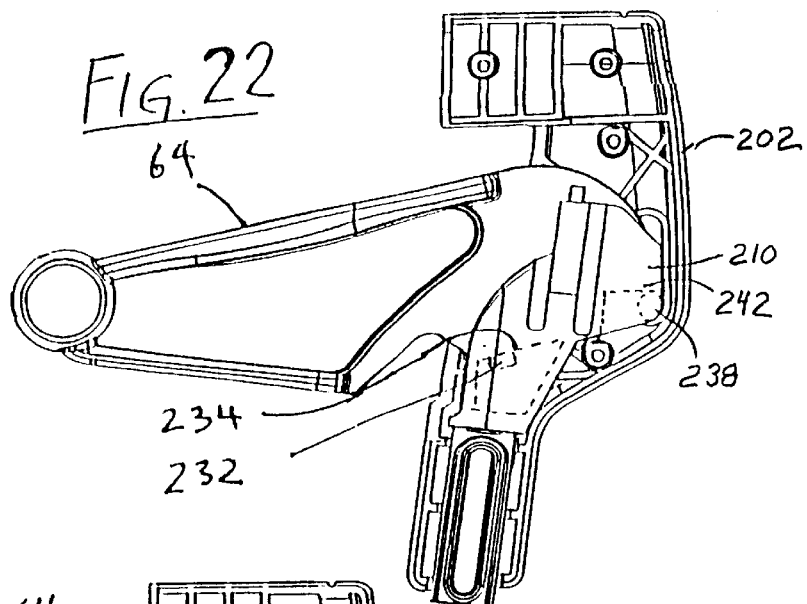
FIG. 22 is a side view of the inside of the left brake housing half showing the brake lever and the brake actuator slide in the neutral position.

Referring to FIGS. 20 and 22, brake lever 64 is shown in the neutral position when no manual braking action is applied. In this position, the brake lever 64 projects rear-wardly in a direction slightly below horizontal. Pivot pin 228 rests at the bottom of slot 230 in left side housing shell 202 and camming lug 236 (shown in phantom lines) rests on upward facing abutment surface 240 formed on the inside surface of left side housing shell 202. Brake lever 64 is retained in this position by the downward pressure of bias spring 218 acting on brake actuator 210, as can be seen with reference to FIG. 17.

Downward facing abutment surface 242 (shown in phantom lines) formed in brake actuator 210 abuts the upper surface of brake lock actuating lug 238 (shown in phantom lines) formed in brake lever 64 and the downward action of bias spring 218 on brake actuator 210 urges pivot pin 228 to the bottom of slot 230. Similarly, downward facing abutment surface 234 (shown in phantom lines) formed in brake actuator 210 abuts the upper surface of brake actuating lug 232 (shown in phantom lines) formed in brake lever 64 and the downward action of bias spring 218 on brake actuator 210 urges camming lug 236 into engagement with upward facing abutment surface 240.

Thus in the neutral position as shown in FIGS. 20 and 22, brake lever 64 rests with pivot pin 228 at the bottom of slot 230 and camming lug 236 resting on upward facing abutment surface 240. Brake actuator 210 is urged downwardly by bias spring 218 and rests with downward facing abutment surface 242 resting on brake lock actuating lug 238 and downward facing abutment surface 234 resting on brake actuating lug 232.

Figure 23:
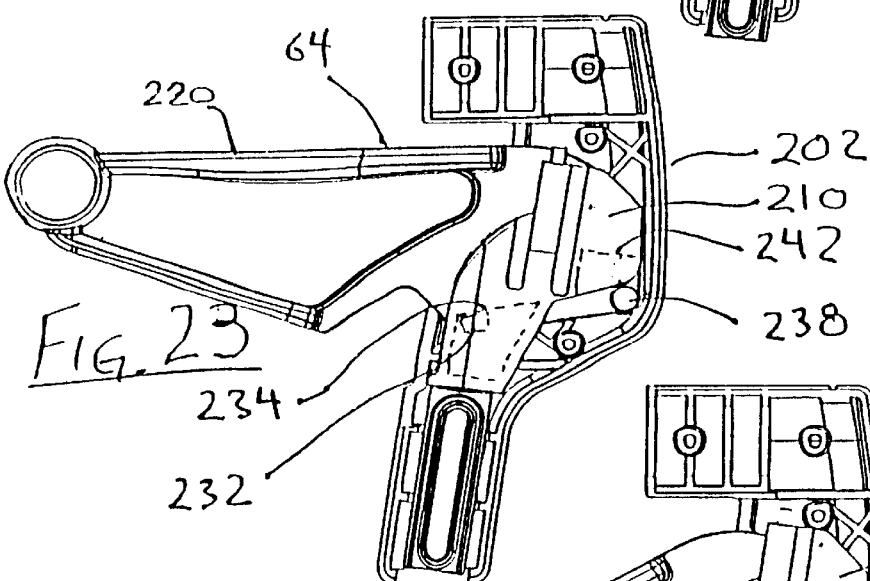
FIG. 23 is a side view of the inside of the left brake housing half showing the brake lever and the brake actuator slide in the raised brake actuating position.

Referring to FIG. 23, brake lever 64 is shown in the braking position when manual braking action is applied. In this position, the brake lever 64 has been pivoted about pivot pin 228 in the bottom of slot 230 until the upper arm 220 of brake lever 64 is substantially horizontal. This pivoting action causes brake actuating lug 232 (shown in phantom lines) to raise brake actuator 210 by engagement with downward facing abutment surface 234 (shown in phantom lines). By manually releasing brake lever 64, bias spring 218 will urge brake actuator 210 back to the neutral position shown in FIG. 13. The upward motion of brake actuator 210 between the neutral and braking positions is transmitted to rear wheel brake shoes 66 in a manner described below.

Figure 21:
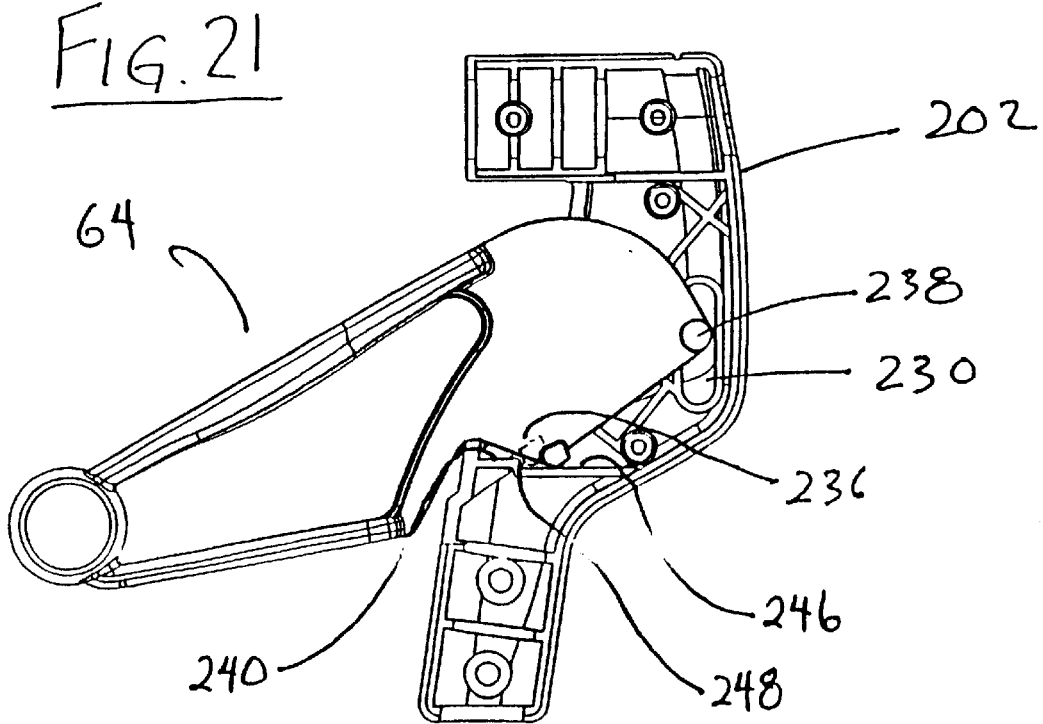
FIG. 21 is a side view of the inside of the left brake housing half showing the brake lever in the depressed brake locking position.
Figure 24:
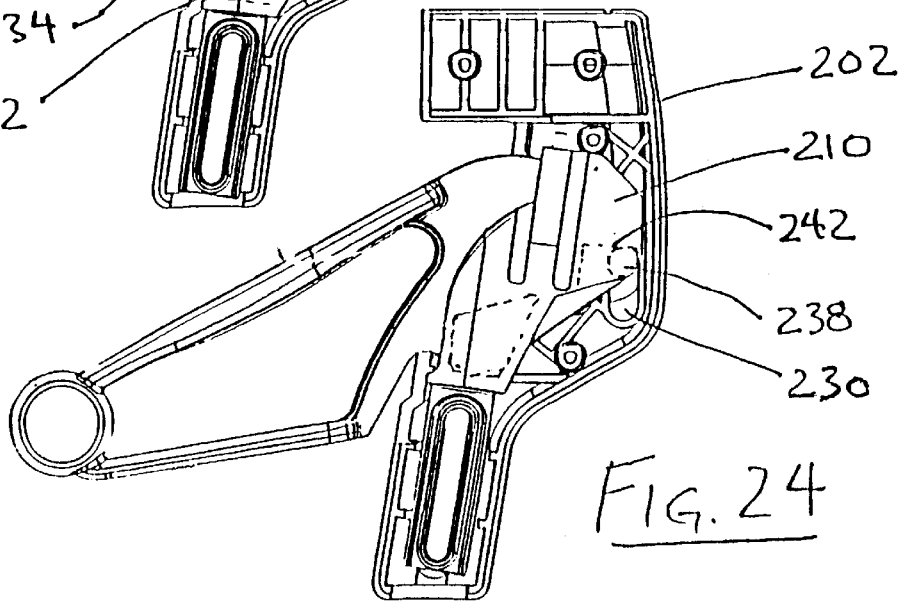
FIG. 24 is a side view of the inside of the left brake housing half showing the brake lever in the depressed brake locking position.

Referring to FIGS. 21 and 24, brake lever 64 is shown in the locked or "park" position. In this position, brake lever 64 has been pivoted down about camming lug 236 (shown in FIG. 21 in phantom lines). This pivoting motion causes pivot pin 228 to move upward in slot 230 and draws camming lug 236 forward over upward facing abutment surface 240 onto lower abutment surface 246.

As can be seen with reference to FIG. 24, this pivoting motion causes brake lock actuating lug 238 (shown in phantom lines) to raise brake actuator 210 by engagement with downward facing abutment surface 242 (shown in phantom lines). Brake lever 64 is retained in this locked or "park" position by the downward pressure of bias spring 218 acting on brake actuator 210 which urges camming lug 236 backwards into engagement with forward facing abutment surface 248. Downward bias is also provided by spring 290 (see FIG. 27). By applying manual pressure to raise brake lever 64, camming lug 236 is raised over forward facing abutment surface 248 and returns to the neutral position shown in FIG. 22. Thus, the sliding movement of camming lug 236 over forward facing abutment surface 248 provides an over-centre action to lock and unlock brake lever 64. The upward motion of brake actuator 210 between the neutral and lock or "park" positions is transmitted to rear wheel brake shoes 66, as described below.

As is evident from the foregoing description, the user can apply and release a braking force to the walker by pulling up and releasing brake lever 64, and can apply a constant braking force by pushing brake lever 64 down into the locked or "park" position.

Figure 25:
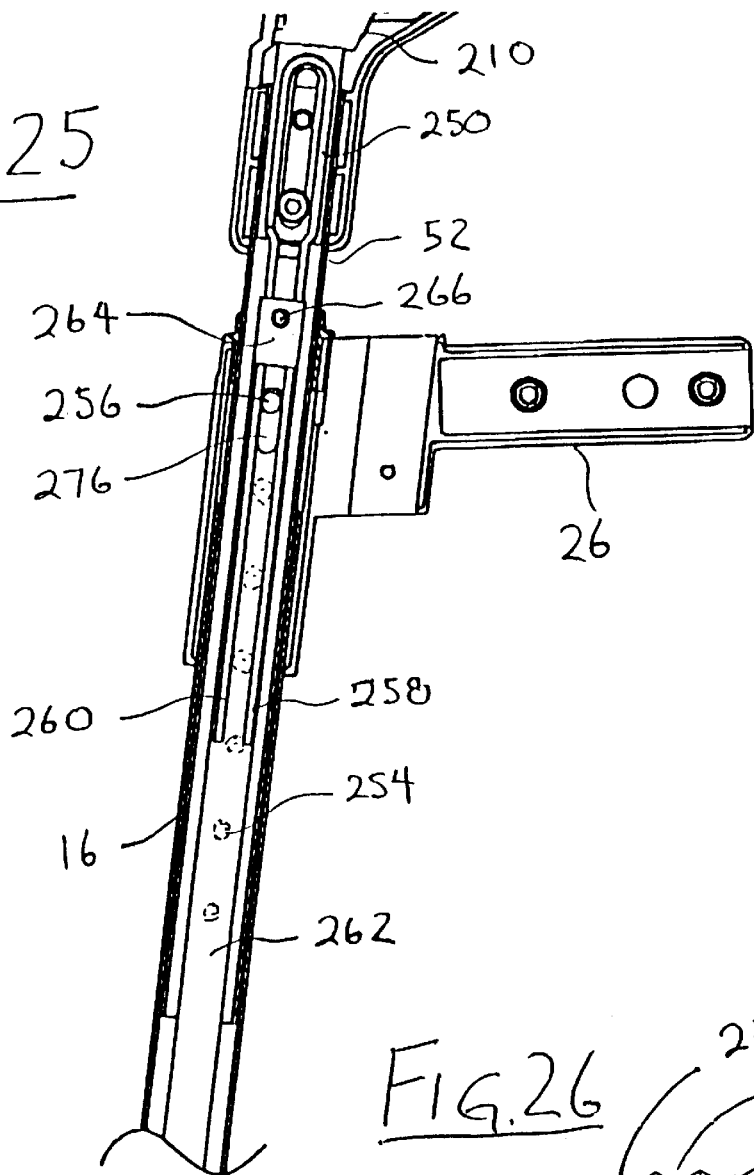
FIG. 25 is a right side view in partial section of the internal brake actuating mechanism of the present invention.

Referring now to FIG. 25, the manner in which the upward motion of brake actuator 210 is transmitted to rear wheel brake shoe 66 is shown. Brake actuator 210 is bolted in the upper end of telescopic tube 52 as described above. Telescopic tube 52 is slidably received inside rear leg member 16. Rear leg member 16 is fixedly attached to fixed rear leg bracket 26 in a manner that leaves the inside volume of rear leg member 16 open to permit telescopic tube 52 to slide therein. For example, bosses having threaded sockets can be provided on the outer surface of rear leg member 16 and corresponding keyway can be formed in fixed rear leg bracket 26 to receive such bosses. Leg 16 and bracket 26 can then be secured by bolting through an aperture in the keyway into the threaded sockets.

Telescopic tube 52 is provided with a series of evenly spaced holes 254 along a portion of its length. Fixed rear leg bracket 26 has a transverse bore 256 formed in each side, with the inner bore being internally threaded to receive the threaded end of thumb screw 54 (see FIG. 1). Handgrip assembly 50 may be fixed at the desired height by aligning a selected hole 254 in telescopic tube 52 with bore 256 in bracket 26. Thumb screw 54 is inserted into the outer bore 256 of bracket 26, through the selected hole 254 in telescopic tube 52, and is screwed into the threaded inner bore 256 on the opposite side of bracket 26.

This arrangement provides for a secure manner of adjustably attaching handgrip assembly 50 to the fixed rear leg bracket 26 of the walker. The use of thumb screw 54 which passes entirely through telescopic tube 52 and is threaded into the opposite side of bracket 26 distributes the load applied by the user on handgrip assemblies 50 evenly across bracket 26. This is a far more durable means of attachment than that one which merely secures the telescopic tube by a thumbscrew which passes through one wall of the bracket and squeezes against the outer surface of the telescopic tube. A solid attachment between the telescopic tube 52 and bracket 26 is extremely important not only for reasons of durability and safety, but also because of the sense of security imparted to the user. Users are far less willing to accept a walker if the handgrip assemblies feel loose or flimsily mounted. While the through-bolt arrangement of thumbscrew 54 does offer enhanced durability, it does requires a special arrangement to permit brake actuation internally within telescopic tube 52.

Referring to FIG. 25, brake wire 250 is formed in an inverted "U" shape with its bight at its upper end being retained in groove 252 formed in the cylindrical portion 214 of actuator 210. Downwardly extending legs 258 and 260 of brake wire 250 are attached to brake rod 262 by means of clamp 264. Brake rod 262 is an elongated "U" shaped channel member.

Figure 26:
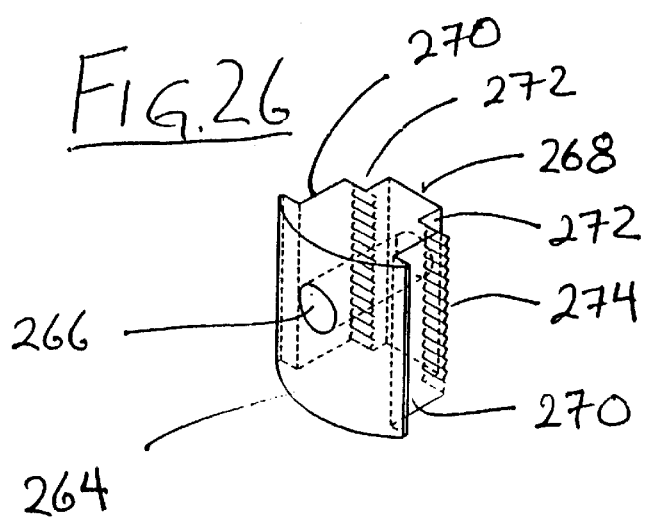
FIG. 26 is a perspective view of the brake wire clamp.

Referring to FIG. 26, clamp 264 has back surface 268 and side surfaces 270 which are sized to be closely received in the "U" channel of brake rod 262. Recesses 272 are provided to accommodate downwardly extending legs 258 and 260 of brake wire 250 and teeth 274 are formed in recesses 272 to grip brake wire 250. Clamp 264 is drawn tight against the upper end of brake rod 262 by means of Allen screw 266 and teeth 274 trap and secure brake wire 250 to brake rod 262. Allen screw 266 is axially aligned with the first hole 254 in telescopic tube 52 above bracket 26 permitting a wrench or key to be inserted therethrough for the purpose of loosening or tightening clamp 264. Brake wire 250 can advantageously be formed of wound steel piano wire (e.g. 0.09 inch diameter) as the ridged surface thereof can be securely gripped by teeth 274.

Elongated slot 276 is formed in the centre web of brake rod 262. Thumbscrew 54 which is threaded into transverse bore 256 passes through slot 276. Slot 276 is sized as to permit brake rod 262 to be displaced longitudinally by the upward and downward movement of brake actuator 210 without contacting thumbscrew 54.

In order to adjust the height of handgrip assemblies 50, a key or wrench is inserted through hole 254 above bracket 26 and Allen screw 266 is loosened to permit relative longitudinal movement between brake wire 250 and brake rod 262. Thumb screw 54 is then unscrewed and withdrawn from transverse bore 256. Telescopic tube is then raised or lowered until the desired hole 254 is axially aligned with transverse bore 256 and thumbscrew 54 is re-inserted and tightened to secure telescopic tube 52 in bracket 26. Finally, Allen screw 266 is tightened to secure brake wire 250 to brake rod 262.

Figure 27:
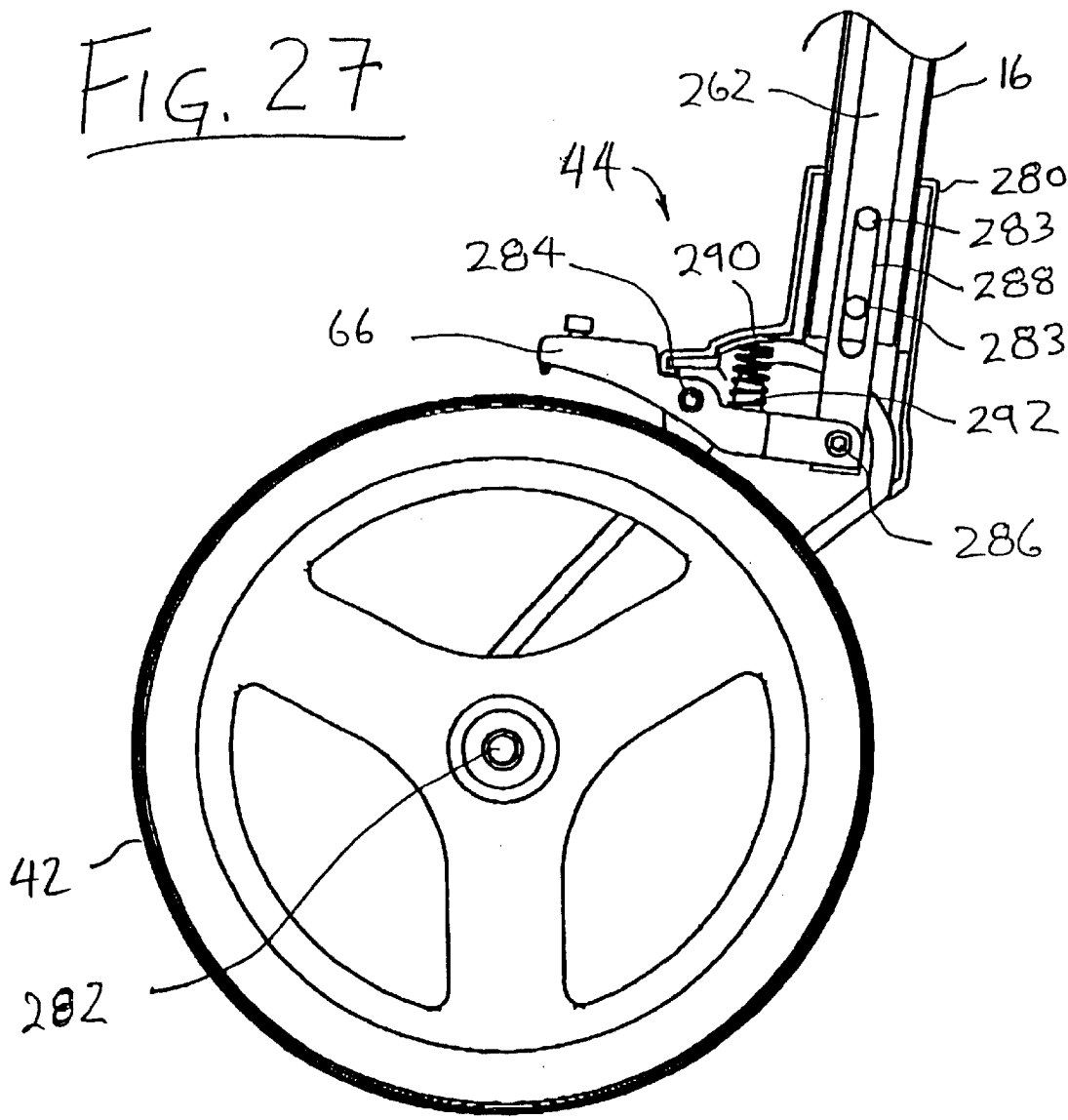
FIG. 27 is a right side view, in partial section showing the brake shoe connection details.

Referring to FIG. 27, rear fork assembly 44 comprises inner and outer fork housings 280 (only one of which is shown in FIG. 20) between which rear wheel 42 is mounted for rotation about axle 282. Rear fork assembly 44 is attached to rear leg member 16 by means of through-bolts (not shown) which pass through holes 283 in the fork housings and rear leg member 16. Brake shoe 66 is pivotally mounted on shaft 284 which is transversely secured between fork housings 280. Brake rod 262 is connected at its bottom end to brake shoe 66 at pivot point 286. Elongated slot 288 is provided in the centre web of brake rod 262 to permit the through-bolts to pass therethrough and is sized to permit brake rod 262 to be displaced longitudinally by the upward and downward movement of brake actuator 210 without contacting the through-bolts. Spring 290 is retained between lug 292 and housing 280 and biases brake shoe out of engagement with rear wheel 42.

Figure 28:
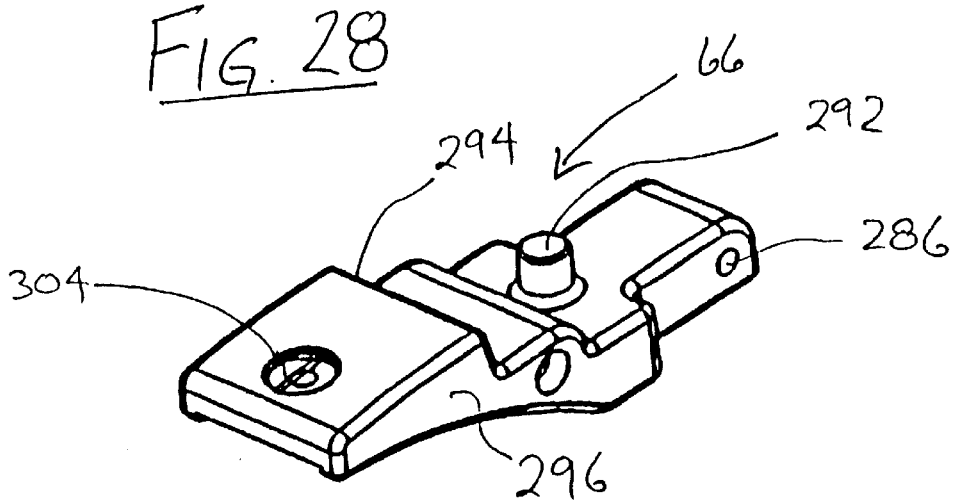
FIG. 28 is a perspective view of the brake shoe.
Figure 29:
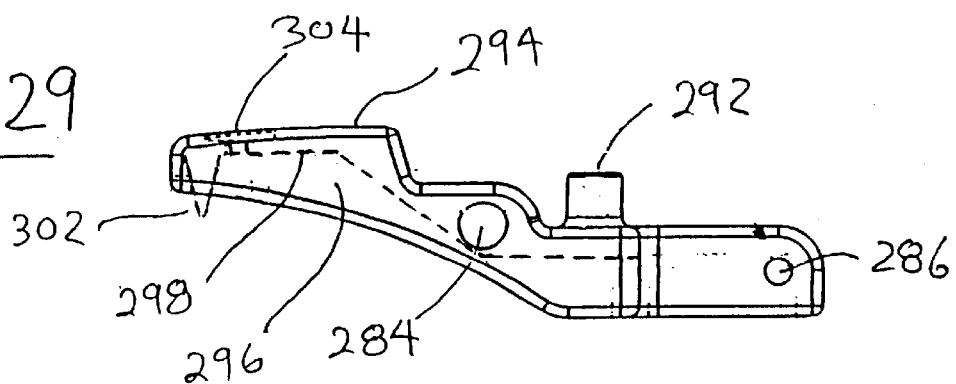
FIG. 29 is a side view of the brake shoe showing the position of the friction member.
Figure 30:
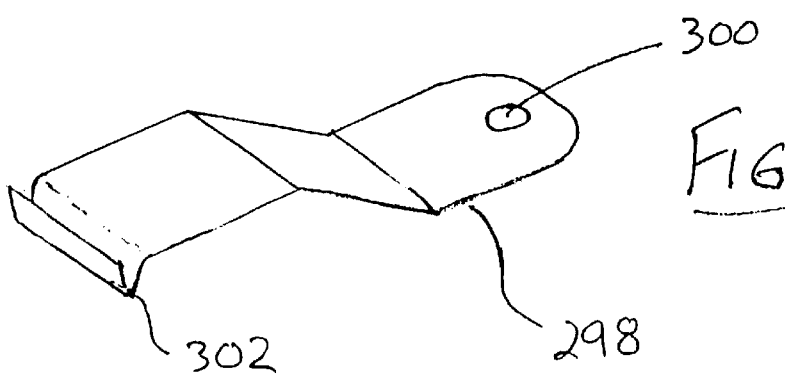
FIG. 30 is a perspective view of the friction member.

Referring to FIGS. 28 to 30, the details of brake shoe 66 can be more readily seen. Brake shoe 66 has a horizontally disposed upper surface 294 an vertical sidewalls 296 which together bound a downwardly open cavity. Friction member 294 is carried within said cavity and is attached thereto at point 300. Friction member 294 has downwardly protruding tang 302 at its rearward end. Adjusting screw 304 is threaded through the upper surface 294 of brake shoe 66 and contacts the upper surface of friction member 294. The extent to which tang 302 protrudes below brake shoe 66 can be varied by turning adjusting screw 304 in or out. This adjustability permits fine tuning of the braking action and compensates for tire wear.

When brake rod 262 is moved upwardly by the operation of brake lever 64, brake shoe 66 is caused to pivot about shaft 284 forcing tang 302 downward into frictional engagement with rear wheel 42. When brake lever 64 is released and returns to its neutral position, brake rod 262 moves downwardly and brake shoe 66 pivots out of frictional engagement with rear wheel 42. In this manner, braking action is transmitted from brake lever 64 to brake shoe 66 internally of telescopic tube 52 and rear leg member 16.

While the present invention has been described with reference to the embodiments disclosed in the Figures, it will be understood that variations and modifications may be made without necessarily departing from the scope of the invention. Accordingly, the scope of the invention is to be determined in accordance with the claims appended hereto.

We claim:

1. A wheel walker, comprising:

a longitudinal axis in the forward and rearward directions;

a pair of front wheels evenly spaced on either side of said longitudinal axis along a front transverse axis and rotatably mounted at the lower ends of a pair of upwardly extending front leg members;

a pair of rear wheels evenly spaced on either side of said longitudinal axis along a rear transverse axis and rotatably mounted at the lower ends of a pair of upwardly extending rear leg members;

a horizontal seating surface transversely disposed at the upper ends of said front and rear leg members;

a pair of height adjustable handle bar members projecting upwardly and rearwardly of said seating surface and comprising a pair of push handle assemblies disposed at the upper ends of said handle bar members;

a generally arcuate shaped backrest disposed transversely between the upper end of said handle bar member;

pivotal attachment means disposed substantially in vertical alignment over the longitudinal mid-point of said seating surface for connecting said backrest to said handle bar members, said pivotal attachment means permitting said backrest to be pivoted between a first position in which said backrest extends in a generally horizontal forward projecting position adapted to support a rearward facing seated user's back when in the walker configuration and a second position in which said backrest extends in a generally horizontal rearward projecting position adapted to support a forward facing seated user's back when in the transport chair configuration;

stop means on said handle bar members for selectively retaining said backrest in said first or second position, without interfering with free pivotal movement of said backrest between said first and second positions, said stop means comprising a pair of opposed first abutment surfaces on said handle bar members and on said backrest which are maintained in contact when said backrest is in said first position and a pair of opposed second abutment surfaces on said handle bar members and on said backrest which are maintained in contact when said backrest is in said second position.

2. The wheeled walker of claim 1 wherein said handle bar members are slidably received for telescopic movement within the upper ends of said rear leg members.

3. The wheeled walker of claim 1 wherein each of said handle bar members further comprises a backrest connection member projecting forwardly from the upper end thereof and wherein said pivotal attachment means connects said backrest to said backrest connection member.

4. The wheeled walker of claim 3 wherein said backrest connection members are connected to said push handle assemblies.

5. The wheeled walker of claim 4 wherein said abutment surfaces on said handle bar members are on said connection members.

6. The wheeled walker of claim 1 wherein said backrest is a strap formed of a flexible plastic material with said attachment means integrally moulded at the ends thereof.

7. The wheeled walker of claim 1 further including a cross-bar member extending transversely between the lower ends of said front leg members, the said cross-bar member having a central portion thereof that is disposed substantially in vertical alignment with or rearward of the front edge of said seating surface.

8. The wheeled walker of claim 7 wherein said cross-bar member includes end fittings extending forward of the lower end of said forward leg members, and wherein each of said front wheels is rotatably mounted in a caster type fork assembly having a vertically disposed mounting shaft, said mounting shaft being rotatably received in one of said end fitting.

9. The wheeled walker of claim 8 wherein said cross-bar member and said end fittings are unitarily moulded.

10. The wheeled walker of claim 1 including a footrest member mounted for pivotal movement between a stowed position transversely disposed between said front leg members and a deployed position projecting forward of the lower ends of said front leg members for supporting a forward facing seated user's feet when in the transport chair configuration.

11. The wheeled walker of claim 8 including a footrest member mounted to said end fittings for pivotal movement between a stowed position transversely disposed between said front leg members and a deployed position projecting forward of the lower ends of said front leg members for supporting a forward facing seated user's feet when in the transport chair configuration.

12. A wheeled walker comprising:

a pair of height adjustable handlebar members;

a generally arcuate shaped backrest disposed transversely between the upper ends of said handle bar members;

pivotal attachment means for connecting said backrest to said handle bar members, said pivotal attachment means permitting said backrest to be pivoted between a first position in which said backrest extends in a generally horizontal forward projecting position and a second position in which said backrest extends in a generally horizontal rearward projecting position; and stop means on said handle bar members for selectively retaining said backrest in said first or second position, said stop means comprising a pair of opposed first abutment surfaces on said handle bar members and on said backrest which are maintained in contact when said backrest is in said first position and a pair of opposed second abutment surfaces on said handle bar members and on said backrest which are maintained in contact when said backrest is in said second position.

13. The wheeled walker of claim 12 wherein said backrest is a strap formed of a flexible plastic material with said attachment means integrally moulded at the ends thereof.

* * * * *

UNITED STATES PATENT AND TRADEMARK OFFICE
CERTIFICATE OF CORRECTION

PATENT NO. : 6,659,478 B2
DATED : December 9, 2003
INVENTOR(S) : Bjarki Hallgrimsson et al.

It is certified that error appears in the above-identified patent and that said Letters Patent is hereby corrected as shown below:

<u>Column 14,</u>
Line 21, change the numeral "8" to the numeral -- 7 --.

Signed and Sealed this

Twenty-third Day of March, 2004

JON W. DUDAS
*Acting Director of the United States Patent and Trademark Office*